Figure 1A:
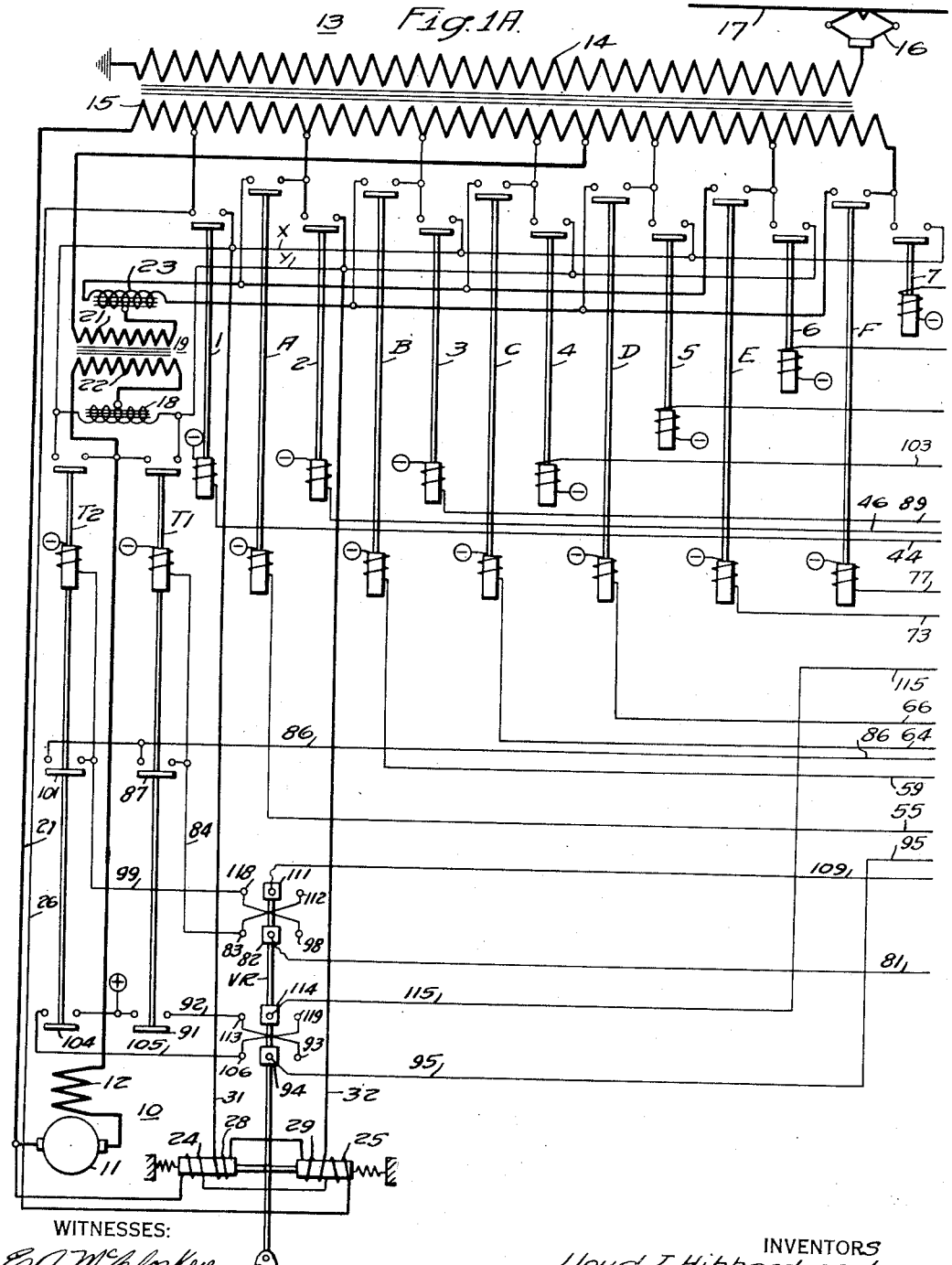

Jan. 7, 1941.     L. J. HIBBARD ET AL     2,227,499

LOCOMOTIVE CONTROL SYSTEM

Filed Dec. 28, 1939     3 Sheets—Sheet 3

Fig. 2.

| Notch | \multicolumn{15}{c|}{Switches} |
|---|---|---|---|---|---|---|---|---|---|---|---|---|---|---|---|
|  | 1 | 2 | 3 | 4 | 5 | 6 | 7 | A | B | C | D | E | F | T1 | T2 |
| 1 | o | o |  |  |  |  |  | o | o |  |  |  |  |  |  |
| 2 | o | o |  |  |  |  |  |  | o | o |  |  |  |  |  |
| 3 | o | o |  |  |  |  |  |  |  | o | o |  |  |  |  |
| 4 | o | o |  |  |  |  |  |  |  |  | o | o |  |  |  |
| 5 | o | o |  |  |  |  |  |  |  |  | o | o |  |  |  |
| 6 | o | o |  |  |  |  |  |  |  |  | o | o | o |  |  |
| 7 |  | o |  |  |  |  |  |  |  |  |  |  | o |  |  |
| 8 |  | o | o |  |  |  |  | o | o |  |  |  | o |  |  |
| 9 |  | o | o |  |  |  |  | o | o |  |  |  |  |  |  |
| 10 |  | o | o |  |  |  |  |  | o | o |  |  |  |  |  |
| 11 |  | o | o |  |  |  |  |  | o | o |  |  |  |  |  |
| 12 |  | o | o |  |  |  |  |  |  | o | o |  |  |  |  |
| 13 |  | o | o |  |  |  |  |  |  |  | o | o |  |  |  |
| 14 |  | o | o |  |  |  |  |  |  |  | o | o |  |  | o |
| 15 |  | o |  |  |  |  |  |  |  |  |  |  |  |  | o |
| 16 |  | o | o |  |  |  |  | o | o |  |  |  |  |  | o |
| 17 |  | o | o |  |  |  |  | o | o |  |  |  |  |  |  |
| 18 |  | o | o |  |  |  |  |  | o | o |  |  |  |  |  |
| 19 |  | o | o |  |  |  |  |  | o | o |  |  |  |  |  |
| 20 |  | o | o |  |  |  |  |  |  | o | o |  |  |  |  |
| 21 |  | o | o |  |  |  |  |  |  |  | o | o |  |  |  |
| 22 |  | o | o |  |  |  |  |  |  |  | o | o | o |  |  |
| 23 |  |  | o |  |  |  |  |  |  |  |  |  | o |  |  |
| 24 |  |  | o | o |  |  |  | o | o |  |  |  | o |  |  |
| 25 |  |  | o | o |  |  |  | o | o |  |  |  |  |  |  |
| 26 |  |  | o | o |  |  |  |  | o | o |  |  |  |  |  |
| 27 |  |  | o | o |  |  |  |  |  | o | o |  |  |  |  |
| 28 |  |  | o | o |  |  |  |  |  | o | o |  |  |  |  |
| 29 |  |  | o | o |  |  |  |  |  |  | o | o |  |  |  |
| 30 |  |  | o | o |  |  |  |  |  |  | o | o |  |  | o |
| 31 |  |  |  | o |  |  |  |  |  |  |  |  |  |  | o |
| 32 |  |  |  | o | o |  |  | o | o |  |  |  |  |  | o |
| 33 |  |  |  | o | o |  |  | o | o |  |  |  |  |  |  |
| 34 |  |  |  | o | o |  |  |  | o | o |  |  |  |  |  |
| 35 |  |  |  | o | o |  |  |  | o | o |  |  |  |  |  |
| 36 |  |  |  | o | o |  |  |  |  | o | o |  |  |  |  |
| 37 |  |  |  | o | o |  |  |  |  |  | o | o |  |  |  |
| 38 |  |  |  | o | o |  |  |  |  |  | o | o | o |  |  |
| 39 |  |  |  |  | o |  |  |  |  |  |  |  | o |  |  |
| 40 |  |  |  |  | o | o | o | o |  |  |  |  | o |  |  |
| 41 |  |  |  |  | o | o | o | o |  |  |  |  |  |  |  |
| 42 |  |  |  |  | o | o |  |  | o | o |  |  |  |  |  |
| 43 |  |  |  |  | o | o |  |  |  | o | o |  |  |  |  |
| 44 |  |  |  |  | o | o |  |  |  |  | o | o |  |  |  |
| 45 |  |  |  |  | o | o |  |  |  |  | o | o |  |  |  |

WITNESSES:
E.G. McCloskey
Tho. Chilcott

INVENTORS
Lloyd J. Hibbard and
Cyril E. Baston.
BY
G. M. Crawford
ATTORNEY

Patented Jan. 7, 1941

2,227,499

UNITED STATES PATENT OFFICE 2,227,499

LOCOMOTIVE CONTROL SYSTEM

Lloyd J. Hibbard and Cyril E. Baston, Forest Hills, Pa., assignors to Westinghouse Electric & Manufacturing Company, East Pittsburgh, Pa., a corporation of Pennsylvania Application December 28, 1939, Serial No. 311,350

12 Claims. (Cl. 172—179)

Our invention relates, generally, to control systems and, more particularly, to systems for controlling the operation of alternating current locomotives.

During the operation of an electric locomotive in which the motor voltage is increased by connecting the motors to succcessive taps on the main power transformer by means of main tap switches, and an auxiliary or buckboost transformer is utilized to divide each of the main notches into a plurality of parts, it is essential that all of the various switches operate in the proper sequence. It is particularly important that the switches which govern the transition from one pair of tap switches to the next be operated at the proper time. In previous systems, with which we are familiar, protective interlocking is relied on to insure the proper operation of the tap-changing and transition switches. However, such an interlocking system is complicated and requires a large number of interlocks when a sufficient number of tap-changing switches are utilized to secure the desired operation of a modern locomotive. Furthermore, improper operation of the switches may occur if the interlocks fail to function properly.

An object of our invention, generally stated, is to provide a simplified system for controlling the operation of an alternating current locomotive.

A more specific object of our invention is to insure the proper sequence of operation of the switches of a tap-changing control system having main and auxiliary tap switches.

Another object of our invention is to control the transition from one pair of tap switches to another in a tap-changing system.

A further object of our invention is to provide a polarity-responsive relay for controlling the operation of the tap-changing and transition switches of a locomotive control system.

Other objects of our invention will be explained fully hereinafter or will be apparent to those skilled in the art.

According to our invention, the operation of the auxiliary tap switches of a buck-boost tap-changing scheme is controlled by a polarity-responsive relay during transition from one pair of main tap switches to another. The operation of the transition switches is also controlled by the same relay which is energized from the main transformer and the buses to which the main tap switches are connected.

Figure 1B:
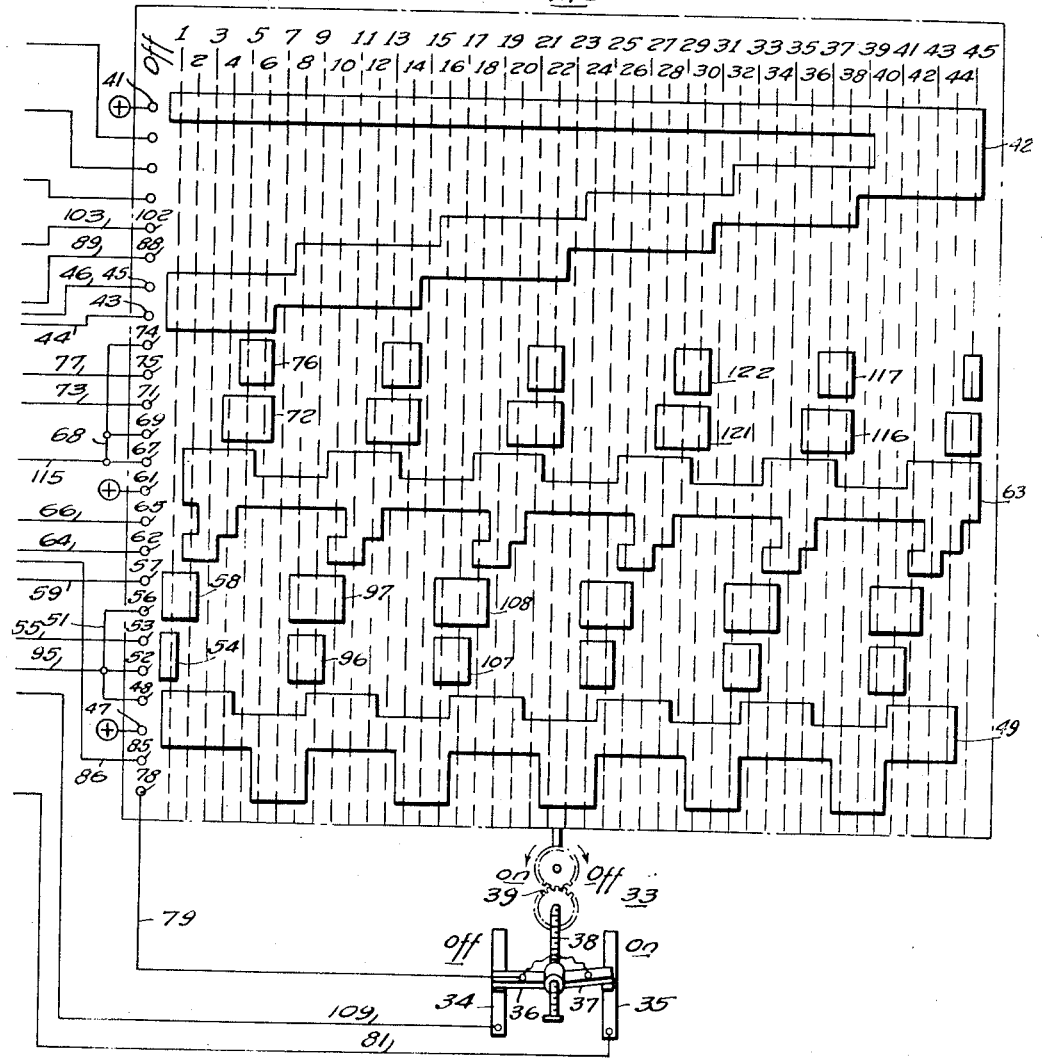

For a fuller understanding of the nature and objects of our invention, reference may be had to the following detailed description, taken in conjunction with the accompanying drawings, in which:

Figures 1A and 1B, when combined, constitute a diagrammatic view of a control system embodying our invention, and Fig. 2 is a chart showing the sequence of operation of the switches shown in Figs. 1A and 1B.

Referring now to the drawings, the system shown therein comprises a motor 10 having an armature winding 11 and a series field winding 12, a main transformer 13 having a primary winding 14 and a secondary winding 15 and a pantograph current collector 16 which engages a trolley conductor 17. The trolley conductor 17 may be energized from any suitable source of power such as a power generating station (not shown).

It will be understood that the motor 10 may be utilized for driving a locomotive (not shown) and that additional motors may be provided, if desired. In order to simplify the drawings and the description, only one motor has been shown in the present application. The acceleration of the locomotive is controlled by varying the voltage applied to the traction motor circuit by means of seven main tap switches, numbered from 1 to 7 inclusive, and a main preventive coil 18.

An auxiliary or buck-boost transformer 19 having a primary winding 21 and a secondary winding 22 is used to divide each of the main notches in a plurality of equal parts. The voltage of the auxiliary transformer 19 is controlled by six auxiliary tap switches, designated by the letters A to F inclusive. One terminal of the primary winding 21 is connected to a tap approximately at the mid-point of the secondary winding 15 of the main transformer 13 while the other terminal may be moved by means of the switches A to F from one end of the transformer to the other, thereby changing the voltage of the secondary winding 22 from maximum in one direction through zero to maximum in the other direction. The voltage of the auxiliary transformer 19 is varied through its complete range for each pair of the main or numbered tap switches. The transition from one pair of numbered switches to the next is made without appreciable tractive effort sags or current surges.

An auxiliary preventive coil 23 is provided for use in conjunction with the auxiliary switches A to F, thereby permitting any two of these switches which are connected to opposite terminals of the preventive coil to be closed at the same time. Likewise, any two of the main tap switches 1 to 7 which are connected to opposite terminals of the preventive coil 18 through buses X and Y may be closed at the same time. The tap switches may be so interlocked in the usual manner that the simultaneous closing of any two switches which are connected to a common bus is prevented.

In order to reduce the duty imposed on the tap-changing switches, a pair of transition switches T1 and T2 is provided. The transition switches T1 and T2 are so operated that the tap switches 1 to 7 are opened under no-load equi-potential conditions during the notching sequence as transitions are made from one transformer tap to the next. Likewise the tap switches are closed under no-load equi-potential conditions during the notching operations.

A polarized relay VR is provided which functions as a supervisory transition relay. The relay VR is of a balanced type, spring biased to the mid-position. Each coil has two windings disposed on oppositely disposed solenoids. Polarizing windings 24 and 25 are connected through conductors 26 and 27 to a section of the secondary winding 15 of the main transformer 13. The other windings 28 and 29 are connected across the buses X and Y through conductors 31 and 32.

The polarity of the buses X and Y changes as a different pair of the main tap switches 1 to 7 is closed, but the polarity of the polarizing windings 24 and 25 remains the same. Since the windings are so disposed on the solenoids that they aid each other when their polarity is the same and oppose each other when of opposite polarity, the relay VR will be in one or the other position, depending on the polarity of the buses X and Y when both buses are energized. If only one bus is energized, the windings 28 and 29 are deenergized and the relay VR is actuated to its mid-position, as previously explained.

A master controller MC, which may be of the drum type, is provided for controlling the operation of the main tap switches 1 to 7. The controller MC may be manually operated or it may be driven by a pilot motor or other suitable device.

A directional switch 33 is provided for indicating the direction in which the controller MC is being operated. As shown, the switch 33 comprises fixed contact members 34 and 35 which may be engaged by movable contact members 36 and 37, respectively. The contact members 36 and 37 are actuated by a screw 38 which is driven by the controller MC through gears 39. It will be seen that when the controller is moving towards the "off" position, the contact member 36 engages the member 34 when the controller is moving toward the "on" position, the contact member 37 engages the member 35.

When the controller MC is moving toward a higher notch, or in the "on" direction, with one polarity of the buses X and Y, only the transition switch T1 may be closed and with the other polarity, only the switch T2 may be closed. The relay VR and the directional switch 33 cooperate with the master controller in selecting the proper transition switch.

Furthermore, the proper pair of auxiliary or lettered switches must be closed after the transition is completed, and a different pair of switches must be closed when the controller MC is moving toward a lower notch than is closed when moving to a higher notch. The directional switch and the relay VR cooperate in selecting the proper pair of auxiliary switches for each direction of movement of the controller MC.

Also, during the transition, the polarity of the buses X and Y changes when the tap switches are changed and the relay VR assumes the opposite position, insuring that the main tap switches have actually changed. If the relay VR does not change position, the lettered or auxiliary switches are prevented from closing.

The manner of making a transition from one pair of tap switches to the next may be more clearly understood by referring to the sequence chart shown in Fig. 2 which illustrates the sequence of operation of the main tap switches 1 to 7, the auxiliary switches A to F and the transition switches T1 and T2. As shown in the sequence chart, the main tap switches 1 and 2 are closed at the start of the notching operations, thereby placing the mid-point of the main preventive coil 18 at a potential midway between the transformer tap to which the switches 1 and 2 are connected.

With the auxiliary switches A and B closed, the voltage in the secondary winding 22 of the auxiliary transformer 19 is one-half the voltage between the taps 1 and 2 and is in a bucking direction. Therefore, the voltage upon the motor circuit is equal to the potential of the tap to which the switch 1 is connected. The voltage of the auxiliary transformer is now varied in equal steps until the switches E and F are closed. The auxiliary transformer voltage is now of the same value as when the switches A and B were closed, but is in the opposite direction. Therefore, the motor voltage is equal to the potential of the tap to which the switch 2 is connected.

The transition switch T1 may now be closed and the switches 1, E and F opened without any change in voltage conditions. Under these conditions all of the load current is momentarily carried by the switches 2 and T1. If the switch 3 is now closed, it will merely carry the exciting current for the preventive coil 18 and the auxiliary transformer 19 without affecting the motor circuit. At this time, the switches A and B may be closed since the voltage with switches 1 and 2 and E and F closed is the same as with switches 2 and 3 and A and B closed. The transition switch T1 may now be opened without any appreciable effect on the voltage and the transition is completed.

The action continues until the switches E and F are again closed, at which time the transition switch T2 is closed and the motor current flows through the switches 3 and T2. The notching continues as shown on the chart with the switches T1 and T2 closing alternately until the desired voltage is reached.

As will be seen from the foregoing explanation, it is essential that the various switches close in exactly the order stated since if the transition switches T1 and T2 are allowed to close at the wrong time, a short-circuit of a portion of the main preventive coil will occur. Likewise, it is essential that the proper auxiliary tap switches, depending upon whether progression is being made toward a higher or a lower notch, be closed following each transition period. The closing of the foregoing switches at the proper time is insured by the control equipment, the operation of which will now be described in more detail.

Assuming that the controller MC is moved to position 1, the main tap switches 1 and 2 and the auxiliary switches A and B are closed. The energizing circuit for the switch 1 may be traced from positive through contact finger 41 on the controller MC, contact segment 42, contact finger 43, conductor 44, and the actuating coil of the switch 1 to negative. The energizing circuit for the switch 2 extends from contact finger 45 through conductor 46 and the actuating coil of the switch 2 to negative. The energizing circuit for the switch A may be traced from positive through contact fingers 47 and 48 bridged by a segment 49 on the controller MC, conductor 51, contact fingers 52 and 53 bridged by a segment 54, conductor 55, and the actuating coil of the switch A to negative. The energizing circuit for the switch B extends from the previously energized conductor 51 through contact fingers 56 and 57 bridged by a segment 58, conductor 59, and the actuating coil of the switch B to negative.

When the controller MC is moved from position 1 to position 2, the switch A is opened and the switch C is closed. The energizing circuit for the switch C may be traced from positive through contact fingers 61 and 62 bridged by a segment 63, conductor 64, and the actuating coil of the switch C to negative.

Likewise, when the controller is moved to position 3, the switch B is opened and the switch D closed. The energizing circuit for the switch D extends from a contact finger 65, which engages the segment 63, through conductor 66 and the actuating coil of the switch D to negative.

As the controller is moved from position 3 to position 4, the switch C is opened, and the switch E closed. The energizing circuit for the switch E may be traced from a contact finger 67, which engages the segment 63, through conductor 68, contact fingers 69 and 71 bridged by a segment 72, conductor 73, and the actuating coil of the switch E to negative.

When the controller is moved to position 5, the switch D is opened and the switch F closed. The energizing circuit for the switch F extends from the previously energized conductor 68 through contact fingers 74 and 75 bridged by a segment 76, conductor 77, and the actuating coil of the switch F to negative.

When the controller is moved to position 6, the transition switch T1 is closed. The energizing circuit for the switch T1 may be traced from a contact finger 78, which engages the segment 49, conductor 79, the contact members 37 and 35 of the directional switch 33, conductor 81, contact members 82 and 83 of the relay VR, which is in the left-hand position, conductor 84 and the actuating coil of the switch T1 to negative. A holding circuit is established for the switch T1 which extends from a contact finger 85 on the controller MC through conductor 86, an interlock 87 on the switch T1, the conductor 84, and the coil of the switch T1 to negative. It will be noted that the directional switch 33 and the polarity relay VR cooperate in selecting the proper transition switch for operation at this time.

As the controller MC moves from position 6 to position 7, the switches 1, E and F are deenergized, thereby permitting these switches to open. When the controller is advanced to position 8, the switch 3 is closed. The energizing circuit for the switch 3 extends from a contact finger 88, which engages the segment 42, through conductor 89 and the actuating coil of the switch 3 to negative.

At this time, the switches A and B are reclosed. The energizing circuit for the switch A may be traced from positive through an interlock 91 on the switch T1, conductor 92, contact members 94 and 93 on the relay VR, which was actuated to the right-hand position upon the closing of the switch 3, conductor 95, contact fingers 52 and 53 bridged by a segment 96, and thence to the actuating coil of the switch A through a circuit previously traced. The energizing circuit for the switch B extends from the previously energized conductor 95 through conductor 51, contact fingers 56 and 57 bridged by a segment 97, and thence through a circuit previously traced to the actuating coil of the switch B.

The transition is completed by moving the controller to position 9, thereby deenergizing the switch T1, which permits this switch to open. The switches C, D, E and F are closed in the manner hereinbefore explained to increase the motor voltage by operating the controller through positions 10, 11, 12 and 13.

When the controller reaches position 14, the transition switch T2 is closed. The energizing circuit for the switch T2 may be traced from the contact finger 78 on the controller MC through conductor 79, contact members 37 and 35, on the directional switch 33, conductor 81, contact members 82 and 98 of the relay VR, which is in the right-hand position since the polarity of the buses X and Y is reversed as explained hereinbefore, conductor 99, and the actuating coil of the switch T2 to negative. A holding circuit is established for the switch T2 which extends from the conductor 86, which is energized at this time, through an interlock 101 on the switch T2 and the conductor 99 through the actuating coil of the switch to negative. In this manner, the relay VR functions to select the proper transition switch for operation at this time.

If the controller is advanced through position 15 to position 16, the switches 2, E and F are opened, and the switch 4 is closed. The energizing circuit for the switch 4 may be traced from a contact finger 102, which engages the segment 42, through conductor 103 and the actuating coil of the switch 4 to negative.

Following the closing of the switch 4, the switches A and B are reclosed. The energizing circuit for the switch A may be traced from positive through an interlock 104 on the switch T2, conductor 105, contact members 106 and 94 on the relay VR, which is in the left-hand position at this time, conductor 95, contact fingers 52 and 53, bridged by a segment 107, and thence to the actuating coil of the switch A through the circuit previously traced. The energizing circuit for the switch B extends from the conductor 95 through contact fingers 56 and 57, bridged by a segment 108, and thence through a circuit previously traced to the actuating coil of the switch B.

The notching operation may be completed in a manner similar to that described by operating the controller MC to position 45, thereby closing the remaining tap switches in the order indicated in the sequence chart and the auxiliary switches in the manner hereinbefore described. The operation of the transition switches and the auxiliary switches is supervised by the relay VR at each transition period as hereinbefore explained.

Assuming that it is desired to decrease the voltage applied to the motor, the controller MC is actuated toward the "off" position, thereby causing the contact member 36 of the directional switch 33. Assuming that the controller is actuated from position 45 to position 40, it will be seen that the auxiliary switches A to F are operated in the reverse order from that during acceleration of the motor, and that the transition switch T1 is closed at this time. The energizing circuit for the switch T1 may be traced from the contact finger 78, which engages the segment 49, through conductor 79, contact members 36 and 34 of the directional switch 33, conductor 109, contact members 111 and 112 of the relay VR, which is in the right-hand position at this time, and conductor 84 through the actuating coil of the switch T1 to negative. Thus, the directional switch 33 and the relay VR function to select the proper transition switch.

As the controller is returned through position 39 to position 38, the switch 7 is opened and the switch 5 is closed, thereby causing the relay VR to change to the left-hand position, as explained hereinbefore. At this time, it is necessary for the auxiliary switches E and F to close. The energizing circuit for the switch E may be traced from positive through the interlock 91 on the switch T1, conductor 92, contact members 113 and 114 on the relay VR, conductors 115 and 68, contact fingers 69 and 71 bridged by segment 116 and thence through a circuit previously traced to the coil of the switch E. The energizing circuit for the switch F extends from the conductor 63 through contact fingers 74 and 75 bridged by a segment 117 and thence through the circuit previously traced to the coil of switch F.

When the controller MC is returned to position 32, the transition switch T2 is closed. The energizing circuit for the actuating coil of the switch T2 may be traced from the contact finger 78, which engages the segment 49, through conductor 79, contact members 36 and 34 of the directional switch 33, conductor 109, the contact members 111 and 118 of the relay VR, which is in the left-hand position, conductor 99 and the actuating coil of the switch T2 to negative.

As the controller is returned to position 30, the relay VR is actuated to the right-hand position since the tap switches 4 and 5 are closed to reverse the polarity of the buses X and Y and the auxiliary switches E and F are reclosed at this time. The energizing circuit for the switch E may be traced from positive through the interlock 104 on the switch T2, conductor 105, contact members 119 and 114 of the relay VR, conductors 115 and 68, contact fingers 69 and 71 bridged by segment 121, conductor 73, and the actuating coil of the switch E to negative. The energizing circuit for the switch F extends from the conductor 68 through contact fingers 74 and 75 bridged by a segment 122, conductor 77, and the actuating coil of the switch F to negative.

In this manner the relay VR and the directional switch 33 supervise the operation of the transition switches T1 and T2 to insure that the proper switch is closed during the transition periods and also control the operation of the auxiliary switches A and B or E and F during the transition period. Thus, when the controller is being advanced toward a higher notch the switches A and B are closed during each transition period, and when the controller is being returned toward a lower notch the switches E and F are closed during transition, it being necessary to reverse the order of operation of the auxiliary switches in accordance with the direction of operation of the controller.

Furthermore, it will be seen that the progression of the notching sequence during a transition period is prevented unless the proper main tap switches have actually closed to cause the relay VR to change position. If the relay VR does not change position, the auxiliary switches are prevented from closing, thereby holding up the progression until the proper tap switches have closed.

From the foregoing description, it is apparent that we have provided a system for controlling the operation of the main and auxiliary tap switches of a locomotive control system which insures that the various switches close in the proper sequence. The system herein described may be utilized in place of a highly complicated interlock system for controlling the operation of the tap-changing switches or preferably, it may be used in conjunction with a simplified interlock system to afford additional protection against possible failures of the interlock system.

Since many modifications may be made in the apparatus and arrangement of parts without departing from the spirit of our invention, we do not wish to be limited other than by the scope of the appended claims.

We claim as our invention:

1. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, auxiliary switches for so connecting said primary winding to the main transformer that the auxiliary transformer alternately bucks and boosts the motor voltage, a pair of transition switches for shunting the auxiliary transformer from the motor circuit during transition from one pair of tap switches to another, and relay means having an actuating coil connected across said common buses for controlling the operation of said transition switches.

2. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, auxiliary switches for so connecting said primary winding to the main transformer that the auxiliary transformer alternately bucks and boosts the motor voltage, a pair of transition switches for shunting the auxiliary transformer from the motor circuit during transition from one pair of tap switches to another, and relay means energized by the potential across said common buses for controlling the operation of said transition switches.

3. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, auxiliary switches for so connecting said primary winding to the main transformer that the auxiliary transformer alternately bucks and boosts the motor voltage, a pair of transition switches for shunting the auxiliary transformer from the motor circuit during transition from one pair of tap switches to another, and relay means responsive to the polarity of said common buses for controlling the operation of said transition switches.

4. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, auxiliary switches for so connecting said primary winding to the main transformer that the auxiliary transformer alternately bucks and boosts the motor voltage, a pair of transition switches for shunting the auxiliary transformer from the motor circuit during transition from one pair of tap switches to another, and relay means responsive to the potential across said common buses and a potential obtained from the main transformer for controlling the operation of said transition switches.

5. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, auxiliary switches for so connecting said primary winding to the main transformer that the auxiliary transformer alternately bucks and boosts the motor voltage, a pair of transition switches for shunting the auxiliary transformer from the motor circuit during transition from one pair of tap switches to another, and relay means responsive to the polarity of said common buses for controlling the operation of said transition switches and said auxiliary switches.

6. In a control system, in combination, a main transformer, a motor energized from said transformer, a plurality of switches for changing taps on said transformer to vary the motor voltage, a part of said tap switches being connected to one common bus and the remainder of said tap switches being connected to another common bus, an auxiliary transformer having a primary winding and a secondary winding, said secondary winding being connected in the motor circuit, auxiliary switches for so connecting said primary winding to the main transformer that the auxiliary transformer alternately bucks and boosts the motor voltage, a pair of transition switches for shunting the auxiliary transformer from the motor circuit during transition from one pair of tap switches to another, said transition switches being operated alternately, and relay means responsive to the polarity of said common buses for controlling the operation of said transition switches.

7. In a control system, in combination, a main transformer, a motor energized from said transformer, a plurality of switches for changing taps on said transformer to vary the motor voltage, a part of said tap switches being connected to one common bus and the remainder of said tap switches being connected to another common bus, an auxiliary transformer having a primary winding and a secondary winding, said secondary winding being connected in the motor circuit, auxiliary switches for so connecting said primary winding to the main transformer that the auxiliary transformer alternately bucks and boosts the motor voltage, a pair of transition switches for shunting the auxiliary transformer from the motor circuit during transition from one pair of tap switches to another, said transition switches being operated alternately, and relay means responsive to the potential across said common buses and a potential obtained from the main transformer for controlling the operation of said transition switches.

8. In a control system, in combination, a main transformer, a motor energized from said transformer, a plurality of switches for changing taps on said transformer to vary the motor voltage, a part of said tap switches being connected to one common bus and the remainder of said tap switches being connected to another common bus, an auxiliary transformer having a primary winding and a secondary winding, said secondary winding being connected in the motor circuit, auxiliary switches for so connecting said primary winding to the main transformer that the auxiliary transformer alternately bucks and boosts the motor voltage, a pair of transition switches for shunting the auxiliary transformer from the motor circuit during transition from one pair of tap switches to another, said transition switch being operated alternately, and relay means responsive to the polarity of said common buses for controlling the operation of said transition switches and said auxiliary switches.

9. In a control system, in combination, a main transformer, a motor energized from said transformer, a plurality of switches for changing taps on said transformer to vary the motor voltage, a part of said tap switches being connected to one common bus and the remainder of said tap switches being connected to another common bus, an auxiliary transformer having a primary winding and a secondary winding, said secondary winding being connected in the motor circuit, auxiliary switches for so connecting said primary winding to the main transformer that the auxiliary transformer alternately bucks and boosts the motor voltage, a pair of transition switches for shunting the auxiliary transformer from the motor circuit during transition from one pair of tap switches to another, said transition switches being operated alternately, and a relay having a coil energized by the potential across said common buses and another coil energized by a potential obtained from the main transformer for controlling the operation of said transition switches and said auxiliary switches.

10. In a control system, in combination, a main transformer, a motor energized from said transformer, a plurality of switches for changing taps on said transformer to vary the motor voltage, a part of said tap switches being connected to one common bus and the remainder of said tap switches being connected to another common bus, an auxiliary transformer having a primary winding and a secondary winding, said secondary winding being connected in the motor circuit, auxiliary switches for so connecting said primary winding to the main transformer that the auxiliary transformer alternately bucks and boosts the motor voltage, a pair of transition switches for shunting the auxiliary transformer from the motor circuit during transition from one pair of tap switches to another, said transition switches being operated alternately, a controller, contact members actuated in accordance with the direction of movement of said controller, and relay means responsive to the polarity of said common buses, said relay means cooperating with said contact members to control the operation of said transition switches.

11. In a control system, in combination, a main transformer, a motor energized from said transformer, a plurality of switches for changing taps on said transformer to vary the motor voltage, a part of said tap switches being connected to one common bus and the remainder of said tap switches being connected to another common bus, an auxiliary transformer having a primary winding and a secondary winding, said secondary winding being connected in the motor circuit, auxiliary switches for so connecting said primary winding to the main transformer that the auxiliary transformer alternately bucks and boosts the motor voltage, a pair of transition switches for shunting the auxiliary transformer from the motor circuit during transition from one pair of tap switches to another, said transition switches being operated alternately, a controller, contact members actuated in accordance with the direction of movement of said controller, and relay means responsive to the polarity of said common buses, said relay means cooperating with said contact members to control the operation of said transition switches and said auxiliary switches.

12. In a control system, in combination, a main transformer, a motor energized from said transformer, a plurality of switches for changing taps on said transformer to vary the motor voltage, a part of said tap switches being connected to one common bus and the remainder of said tap switches being connected to another common bus, an auxiliary transformer having a primary winding and a secondary winding, said secondary winding being connected in the motor circuit, auxiliary switches for so connecting said primary winding to the main transformer that the auxiliary transformer alternately bucks and boosts the motor voltage, a pair of transition switches for shunting the auxiliary transformer from the motor circuit during transition from one pair of tap switches to another, said transition switches being operated alternately, a controller, contact members actuated in accordance with the direction of movement of said controller, and relay means responsive to the polarity of said common buses, said relay means cooperating with said contact members to control the operation of said transition switches, and means actuated by said transition switches and cooperating with said relay means to control the operation of said auxiliary switches.

LLOYD J. HIBBARD.
CYRIL E. BASTON.